W. E. HOSCH, DEC'D.
A. M. HOSCH, ADMINISTRATRIX.
CLOTH MEASURING AND COMPUTING MACHINE.
APPLICATION FILED NOV. 15, 1917.

1,434,998.

Patented Nov. 7, 1922.

Inventor:
Walter E. Hosch,
By
his Atty.

W. E. HOSCH, DEC'D.
A. M. HOSCH, ADMINISTRATRIX.
CLOTH MEASURING AND COMPUTING MACHINE.
APPLICATION FILED NOV. 15, 1917.

1,434,998.

Patented Nov. 7, 1922.
4 SHEETS—SHEET 3.

Inventor:
Walter E. Hosch,
By his Atty.

W. E. HOSCH, DEC'D.
A. M. HOSCH, ADMINISTRATRIX.
CLOTH MEASURING AND COMPUTING MACHINE.
APPLICATION FILED NOV. 15, 1917.

1,434,998.

Patented Nov. 7, 1922.

Patented Nov. 7, 1922.

1,434,998

UNITED STATES PATENT OFFICE.

WALTER E. HOSCH, OF ST. LOUIS, MISSOURI; ANNIE MAE HOSCH, ADMINISTRATRIX OF THE ESTATE OF SAID WALTER E. HOSCH, DECEASED, ASSIGNOR TO THE MEASUREGRAPH COMPANY, OF ST. LOUIS, MISSOURI, A CORPORATION.

CLOTH MEASURING AND COMPUTING MACHINE.

Application filed November 15, 1917. Serial No. 202,133.

*To all whom it may concern:*

Be it known that I, WALTER E. HOSCH, a citizen of the United States, residing in the city of St. Louis and State of Missouri, have invented new and useful Improvements in Cloth Measuring and Computing Machines, of which the following is a specification.

This invention relates to automatic measuring and computing machines, and in the following specification it is described as applied to a type of machine which is used for measuring piece goods such as cloth, ribbon, lace, etc., and for computing the cost of predetermined lengths of such goods. Machines of this type are employed as counter attachments to be used by salesmen in selling goods of the class referred to above.

In my co-pending application Serial No. 17,154 I disclosed a type of machine in which a dial and co-operating pointers indicated the length of the cloth measured, and a pair of fixed price scales co-operated with webs bearing tabulated figures to register the cost of any length of goods indicated on the dial. In that machine one of the pointers or hands of the dial indicated yards and after making one complete revolution it was necessary to reset the indicating mechanism to zero.

The general object of the present invention is to produce a measuring and computing machine of a very simple construction, though having a relatively large capacity, that is to say, a machine which is capable of measuring and computing relatively large quantities of material or goods sold. The novel construction embodying this invention enables the pointer to pass successively through its cycle of movement or revolution, and other parts of the indicating mechanism co-operate with the pointer to indicate the number of revolutions or cyclic movements the pointer has made; and at the same time the cost of the goods at different price rates is indicated on a web. With such an organization of parts the capacity is greatly increased and it is practically never necessary to reset the indicating mechanism to zero during one measuring operation under ordinary circumstances. In the type of machine described in the following specification, the indicating web is mounted so that it is guided past a fixed price scale. After the measuring operation, the tension developed in the web returns the web to its zero position and also operates to return the indicating pointer to its zero position. One of the features of the invention resides in the organization of the parts, including means for reducing the shock upon the web when the indicating mechanism is arrested at its zero position.

Further objects of the invention will appear hereinafter.

In the drawing which fully illustrates the preferred embodiment of my invention:—

Figure 2:
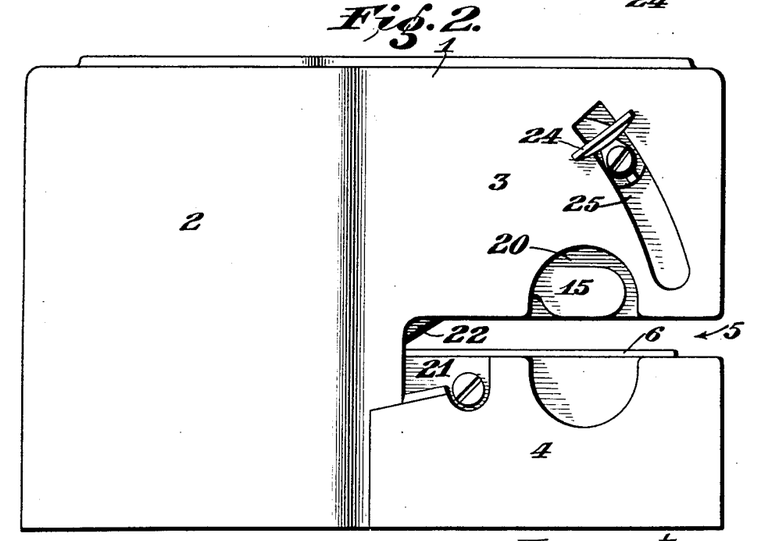
Figure 2, is a side elevation.
Figures 11, 14:
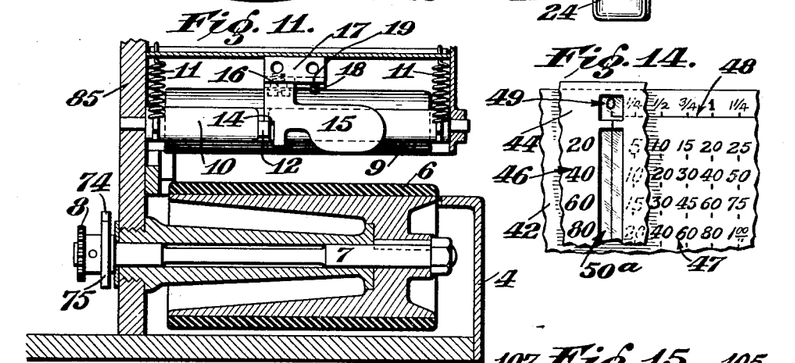
Figure 11 is a vertical section showing details in the construction of the measuring roller.
Figure 14 is a fragmentary plan indicating the character of the computing web which I prefer to employ in the machine.

Referring more particularly to the parts, the instrument comprises a housing or case 1 including a substantially cylindrical upright portion 2, from which project an upper housing 3 and a lower housing 4; between these housings a throat 5 is formed (see Figure 2) through which the goods to be measured may be drawn. In order to drive the indicating mechanism of the instrument to correspond with the length of the goods which passes through the throat 5, a rotary member or measuring roller 6 of predetermined circumference, is mounted on a horizontal axis in the lower housing 4, said roller being rigidly secured to an inner shaft 7, the inner end of which is provided with a pinion 8 Figures 6, 9 and 11 to actuate driving mechanism for the indicating mechanism.

Figure 3:
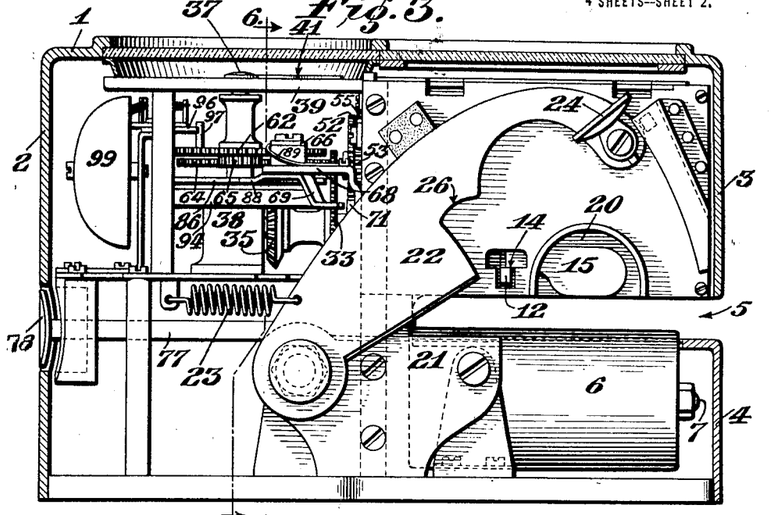
Figure 3 is a longitudinal section through the machine.
Figures 5, 6, 7, 8, 9:
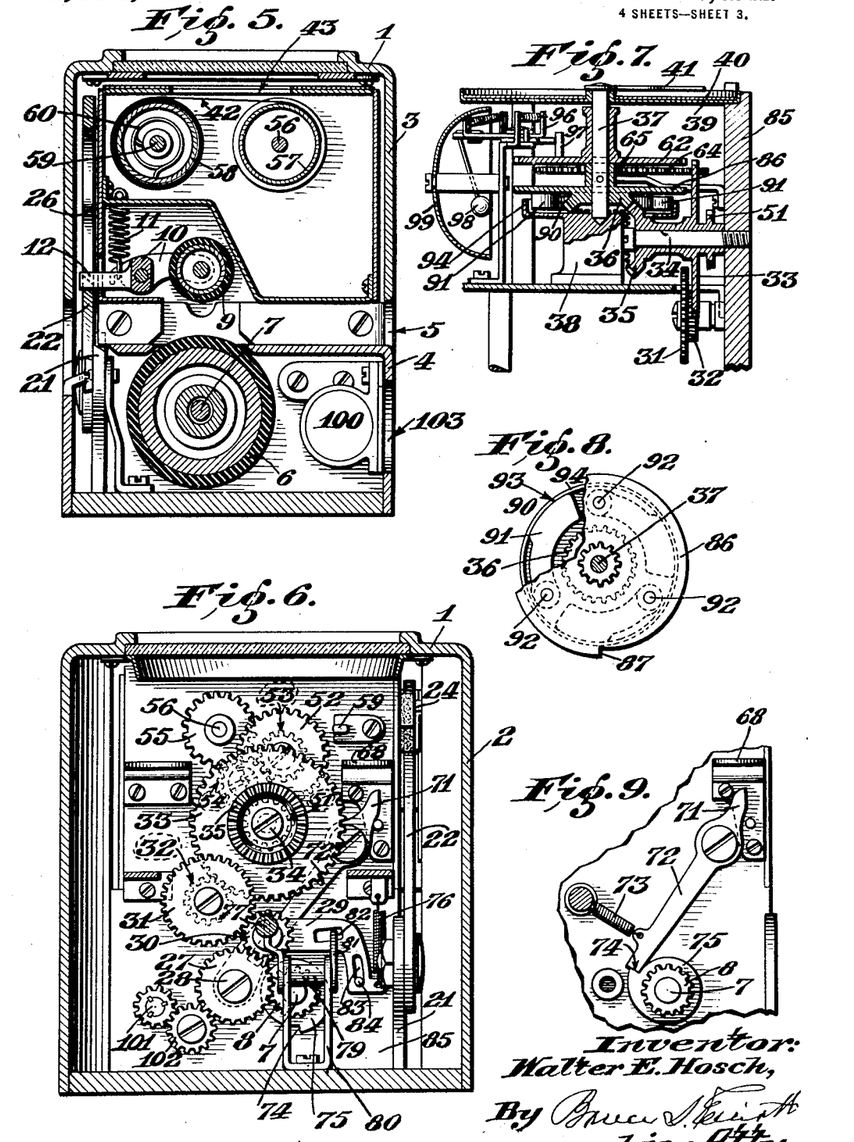
Figure 5 is a vertical cross-section through the machine taken about on the line 5—5 of Figure 1.
Figure 6 is a vertical section taken about on the line 6—6 of Figure 3, but with certain parts removed.
Figure 7 is a vertical section through the upper portion of the machine on the longitudinal axis of the machine, showing details, certain parts being omitted or shown broken away.
Figure 8 is a plan showing details of a governing device for regulating the speed of the movement of the indicating mechanism in its return movement to its zero position.
Figure 9 is a fragmentary view in elevation and partial section, illustrating mechanism for arresting the rotation of the rotary member, that is to say, the member which is affected by the goods being measured or computed.
Figure 12:
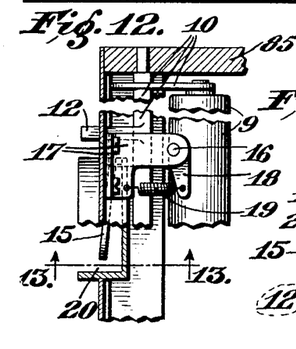
Figure 12 is a fragmentary section and plan, broken away, to further illustrate details of the mechanism associated with the measuring roller.
Figures 13, 15:
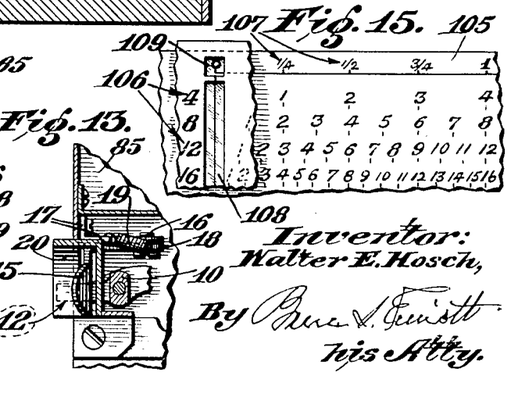
Figure 13 is a vertical section taken about on the line 13—13 of Figure 12, certain parts being broken away.
Figure 15 is a view similar to Figure 14 but showing a modified character of the web.

In order to hold the cloth pressed tightly against the measuring roller, a presser roller 9 is provided, said presser roller being mounted on a rocking frame 10 Fig. 5 to which springs 11 are attached, which tend to hold the roller 9 pressed against the upper face of the measuring roller 6. In order to enable the presser roller 9 to be held away from the measuring roller to enable the goods to be positioned in the throat 5, a latch device is provided, (see Figures 5, 11, 12 and 13). For this purpose the rocking frame 10 is provided with an outwardly projecting arm 12, (see Figure 12,) and when this arm is pressed down it will snap under a shoulder 14, (see Figures 3 and 11,) said shoulder being formed on a latch 15 which is pivoted at 16 on the under side of a bracket 17. The latch is provided with an arm 18 Fig. 12 to which a spring 19 is attached which pulls the latch 15 toward the arm 12. This latch 15 is located in a recess or cup 20 Figures 2, 3 and 12, formed in the side wall of the instrument so that when desired the operator of the instrument may press upon the latch. When this is done, the arm 12 will be released, and the springs 11 will pull the presser roller down onto the measuring roller.

The presser roller 9 is raised automatically by the operation of the marking knife or cutter which cuts the edge of the goods to mark the point where the piece sold is to be severed from the bolt or roll of goods. For this purpose the lower housing 4 is provided at one side with a fixed knife or blade 21, (see Figure 5,) with which co-operates a pivoted blade 22, (see Figure 3.) The blade 22 is normally held elevated by a spring 23, but may be depressed by pressing down on a thumb plate 24 which extends through a slot 25 on the side of the instrument, (see Figure 2.)

When the knife 22 is depressed completely a shoulder 26 on the knife engages the projecting end of the arm 12, (see Figure 3,) and moves the arm down sufficiently to enable the latch 15 to operate in the manner described above.

Any suitable driving mechanism may be provided to enable the indicating mechanism to be driven from the rotary member or roller 6, but it is preferably constructed in such a way that it may be released from the measuring roller at the will of the operator. For this purpose the aforesaid pinion 8 meshes with a gear wheel 27, (see Figure 6,) and on the pivot stud 28 of this gear wheel there is loosely mounted a rocker arm 29, said arm carrying a pinion 30 which meshes with the gear wheel 27 and also normally meshes with a gear wheel 31. This gear wheel 31 rigidly carries a pinion 32 which drives a large gear wheel 33 which is rotatably mounted on a horizontal pivot stud 34 (Figs. 6 and 7). The indicating mechanism includes a pointer which passes through a plurality of cyclic movements for each complete indicating movement of the indicating web. To drive the pointer, the hub of gear wheel 33 carries a rigid bevel gear 35 which meshes with a similar bevel gear 36, and this bevel gear 36 is attached rigidly to arbor or vertical shaft 37 stepped in a pedestal bearing 38, (see Figs. 6 and 7;) the upper end of this shaft is rotatably mounted in a fixed dial plate 39, above which is located a dial 40, (see Figure 1.) The upper end of the shaft 37 carries a rigid hand or pointer 41 which co-operates with the numbers on the dial. These numbers on the dial indicate fractions of a yard, for example ¼, ½ etc., and also include an inner scale the numbers of which indicate inches. That is to say, the dial represents one unit of measure and fractions thereof. The pointer 41 makes successive revolutions around this dial.

Figure 10:
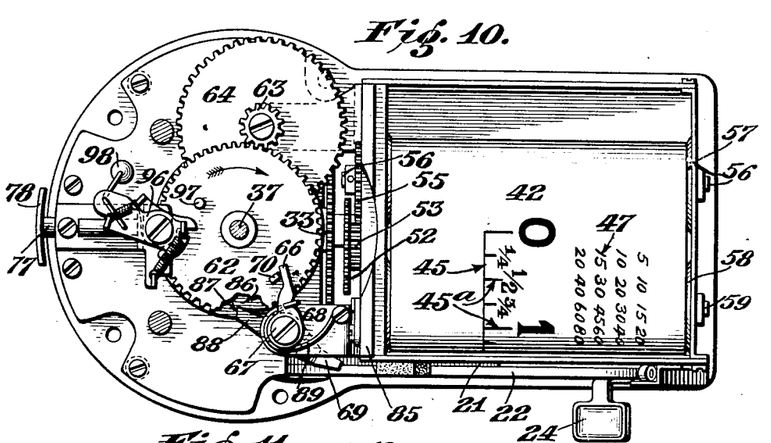
Figure 10 is a plan of the machine with the cover removed.

The indicating mechanism also includes an indicator in the form of a web 42, (see Figures 1 and 5,) and this web is mounted in such a way that it will be visible through a window 43 formed in the face plate 44 in the upper side of the upper housing 3; and associated with the web, I provide means for holding it in tension in guiding or pulling it past the window. This tension means operates to return the web to its zero position and also operates to return the pointer 41 to its zero position. The web 42 is preferably provided with a scale 45, (see Figure 10,) which is provided with divisions 45ª, numbered progressively. These numbers on the scale 45 indicate the number of revolutions made by the pointer 41, during any measuring operation, and hence in operating the machine, by glancing at the window 43 and taking the reading of the pointer 41, the operator will know what length of cloth has been measured in yards or fractions thereof, or in yards and inches.

The window 43 is of considerable width measured in the direction of movement of the chart so that one of the large numbers (such as the zero in Fig. 1) will remain in sight until the next number appears.

Figure 1:
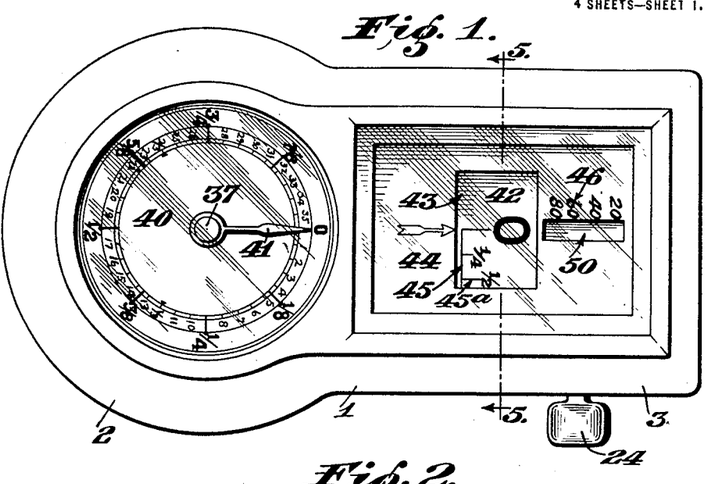
Figure 1 is a plan of a cloth measuring and cost computing machine.

In order to enable the web to indicate the cost or the correct charge to be made for any predetermined amount of goods, I prefer to provide the face plate 44 with a fixed price scale 46 (see Figure 1).

In this view, the price scale is shown with numbers 20, 40, 60 and 80, by way of example, to indicate price rates of 20 cents etc., for a yard of goods. In practice the length and character of this scale will depend upon the requirements of particular service the instrument has to perform. On the web 42, I also provide a scale 47 consisting of tabulated figures, the rows of which are in alinement with the figures of the scale 46. If desired, above the scale 47 I may provide another scale 48 (see Figure 14) indicating fractions of a yard corresponding to the different columns of figures in the scale 47. For example, the number 10 in the second column is in alinement with the number 20, on the fixed price scale, and indicates the charge to be made for one half a yard. In the form shown in Figure 14, as the web passes under the price scale, the numbers of the scale 48 appear successively in a small window 49 formed adjacent the window 50ª for the price scale.

To return to the driving mechanism,—in order to drive the web past the price scale, the gear wheel 33, (see Figure 7,) is provided with a rigid pinion 51, and this pinion drives a gear wheel 52, (see Figure 6). A pinion 53 rigid with the gear wheel 52 drives an idler 54, which in turn meshes with a gear wheel 55 which is attached to the shaft 56 of a take-up roller 57, to which the end of the web 42 is attached. (See Figure 5). This web 42 is normally held coiled upon a drum 58. Associated with the drum 58 I provide means for developing tension in the web 42 when it is wound upon the take-up roller 57. For this purpose the drum 58 is rotatably mounted upon a suitable shaft 59 and a coiled spring 60 is provided around this shaft which is attached to the drum so that it tends to rotate the drum in a left hand direction, as viewed in Figure 5.

The machine is provided with means for stopping the movement of the rotary member or measuring roller 6 at the limit of the movement of the indicating mechanism. For this purpose a controller wheel 62 is provided (see Figs. 7 and 10). It is mounted loosely on the shaft 37, and is in the form of a gear wheel driven by a pinion 63 which is rigid with a large gear wheel 64 (see Figure 10) which in turn is driven by a pinion 65 on the hub of the aforesaid bevel gear wheel 36; these gears and pinions 63, 64, etc., are so proportioned that the controller wheel 62 will make one complete revolution while the web is moving from zero to its maximum registering limit, for example, 20 yards. In the measuring movement this controller wheel 62 rotates in the direction of the arrow in Figure 10. At the limit of its movement, it actuates a dog or finger 66, which is pivotally mounted on a pivot stud 67 on bracket 68; rigid with this finger 66, there is provided a dog 69. When the limit of the forward movement of the indicating mechanism is reached, a dog or pin 70 on the controller wheel engages the right hand side of the finger 66 and rocks this finger on the pivot pin 67 toward the left; this moves dog or arm 69 which moves the upper arm 71 of a stop lever 72, (see Figs. 3 and 9,) thereby rocking the stop lever 72 toward the shaft 7 of the measuring roller. (See Fig. 9). This lever 72 is normally held away from the measuring roller by a coil spring 73. When the stop lever 72 is actuated in this way, its end moves into the path of a tooth or shoulder 74 formed on a disc 75 on shaft 7, and this arrests the rotation of the measuring roller.

Figure 4:
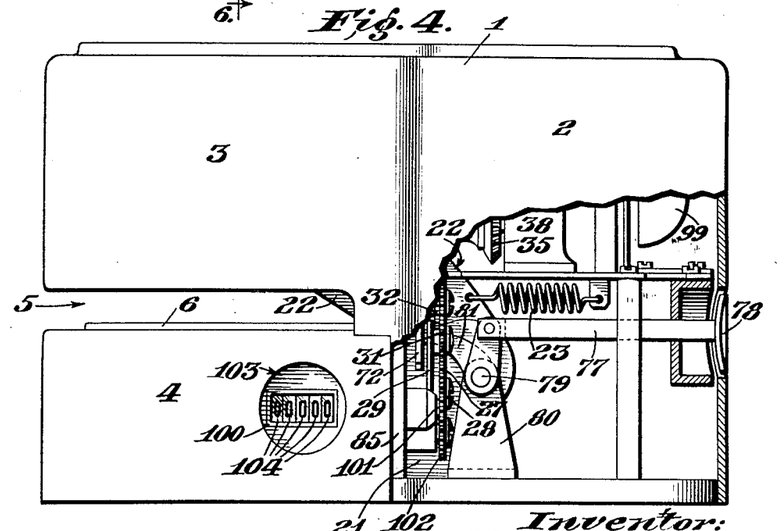
Figure 4 is a side elevation partly broken away and shown in section.

Referring again to the rock lever 29, (see Fig. 6,) this lever is normally pulled up by a spring 76, which holds the pinion 30 normally in mesh with the gear wheel 31. This rock lever 29 may be depressed at the will of the operator through the medium of a push rod 77, (see Figs. 4 and 6) carrying a head 78 accessible from the exterior of the case. By pushing in on this push rod 77 the rod rocks a rock shaft 79 with which it is connected (see Fig. 4) said rock shaft being rotatably mounted in a fixed bracket 80, and carrying a curved cam finger 81, the end of which is received in an opening 82 in the arm. The other end of the arm 29 is guided by a slot 83 which receives a guide pin 84 extending out from the vertical frame plate 85 within the machine.

Now, when the pinion 30 is disconnected from the gear wheel 31, the spring 60 Fig. 5 of the drum 58 operates to rewind the web 42 on the drum 58, and this rotates the shaft 56 of the takeup drum 57 and imparts movement through the driving mechanism to the pointer 41, in this way returning the pointer 41 to its zero position.

Suitable means is provided for stopping the indicating mechanism when it arrives at the zero position. This means is preferably associated with the mechanism near the pointer 41, and will now be described.

Rigid with the pinion 36 there is provided a wheel 86 (See Figs. 7 and 8). This wheel has a shoulder or notch 87 formed in its edge. Rigid with the aforesaid finger 66 there is provided a pawl 88 (see Fig. 10), and associated with the finger 66 a spring 89 is provided, normally holding the finger 66 in an extreme position toward the left, thereby normally holding the pawl 88 out of the path of the shoulder or notch 87. When the spring 60 is rewinding the web 42 on the drum 58, this wheel 86 will rotate in a left hand direction, that is, in a direction opposite to that indicated by the arrow in Fig. 10. Now, when the pointer 41 in the return movement arrives at the zero position, the dog 70 will strike the finger 66 and move it toward the right, thereby overcoming the force of its spring 89 and moving the pawl 88 inwardly. The rotation of the wheel 86 continues until the shoulder or notch 87 comes against the end of the pawl 88; when this occurs, the pointer will be stopped in the zero position, and the web 42 will also be stopped in its zero position.

The spring 89 performs a useful function also in connection with the stop-lever 72, that is to say, it constantly holds the arm 69 against the stop-lever 72.

I provide means for regulating the speed of the return movement. In this connection, it must be understood that the action of the spring 60 tends to produce a high rate of acceleration and a high speed in the return movement of the indicating mechanism, particularly in a machine having a relatively long web, and this tends to produce a considerable shock to the web 42 when the return movement is arrested. In a machine having a single web there might be great strain on the web from this cause. In order to relieve this shock, I provide a regulator which is preferably in the form of a governor device 90, (see Figs. 7 and 8.) This governor device is preferably in the form of a centrifugal friction brake, and for this purpose, it comprises a plurality of brake arms 91, which are pivotally attached at 92 to the under side of the wheel 86. The brake arms 91 have curved faces 93 which lie adjacent to the inner side of a circular flange 94 which is formed on or secured to the upper end of the pedestal bearing 38. If the indicating mechanism tends to "race" under the action of the returning spring 60, that is to say, if the mechanism tends to move too fast, the centrifugal force at the governor arms 91, will press them out against the flange 94 and thereby exert a considerable friction which will retard the returning movement. In this way, I prevent the returning movement from attaining a speed which might injure the mechanism, particularly the web 42.

I provide means for giving a signal at each revolution of the pointer, 41. For this purpose I provide suitable bell ringing mechanism 96, (see Fig. 10,) the details of which have been fully described in my copending application, Serial No. 17,154; this mechanism is actuated at each revolution of the controller wheel 62 by a suitable pin or dog 97. Whenever the dog or pin 97 passes this mechanism moving in the forward direction, it causes the hammer 98 to strike against the bell 99 Fig. 7.

In order to indicate the total number of yards of all goods sold, and measured, on the machine, I provide a counter or totalizer 100, (see Figs. 5 and 6,) the shaft 101 of which is driven from an idle gear wheel 102 which is in mesh with the gear wheel 27 already described. This counter is mounted within the case just behind a window 103, (see Fig. 4,) through which the number wheels 104 of the counter may be seen.

Under some circumstances, customers may ask for goods according to a certain stated cost, for example, a customer may ask for 8 cents' worth of a certain commodity. To meet such a requirement I provide a web 105 of the general character indicated in Fig. 15, that is to say, the web is provided with tabulated figures which are disposed in rows, the numbers of each row being arranged in an arithmetical order, and each row in line respectively with the numbers on a fixed price scale 106; on the edge of this web 105 yards and fractions of a yard 107 are indicated, and these fractions and whole numbers and the tabulated numbers on the web are arranged so that each number in the tabulated scale is a function of the numbers 107 and the numbers of the price scale 106; for example, if a customer demand 4¢ worth of goods worth 8¢ a yard, the goods would be advanced through the machine until the number "4" appears in the window 108 opposite to the number "8", on the price scale. Then in the small window 109 the fraction ½ would appear, indicating that the amount of goods sold is ½ of a yard.

The general mode of operation of the machine will now be briefly stated. The piece of goods to be measured is introduced in the throat 5, over the rotary member or roller 6, and the presser roller 9 is then released by actuating the releasing latch 15, (see Figs. 2 and 11.) The operator then pulls the cloth through the machine. As the cloth passes through the machine, it rotates the measuring roller 6. This roller has a predetermined circumference so that at each revolution, it advances the pointer 41 and the web 42 correspondingly through the medium of the pinion 8 and gear 27, pinion 30 and gear 31, pinion 32 and gear 33, bevel gears 35 and 36 and shaft 37, Figs. 6 and 7, to indicate the length of cloth which has passed over it. As the measuring movement progresses, the pointer 41 passes successively around the face of the dial 39. Each time that the pointer 41 passes the zero mark of the dial, a higher number will be indicated on the web at the window 43. Hence at any moment during the measuring operation, the operator can observe how many revolutions the pointer has made by looking at the web, and he can see what fraction over any number of yards has been measured by looking at the pointer 41. After the measuring operation has been finished, the operator pushes in on the push rod 77, (see Figs. 4 and 6,) and this operates to depress lever 29, and move pinion 30 to the right so as to disengage the driving mechanism from the measuring roller. The spring 60 of drum 58 which has been wound up by winding the web 42 onto the take-up roller 57, then operates to rotate the drum 58 in a rewinding direction, and this rewinds the web on the drum. The tension of the web 42 also operates to produce a return movement in the driving mechanism, which is imparted through the driving mechanism to the pointer 41. The governor device 90, Figures 7 and 8, operates to prevent the mechanism from racing in the return movement, that is to say, it imposes a frictional resistance depending upon the speed, and this reduces the speed of the parts sufficiently to prevent a dangerous shock to the web 42, when the indicating mechanism is stopped in its zero position. This stopping of the indicating mechanism, is of course accomplished by the driving mechanism through the agency of the pawl 88 Figure 10, which is moved inwardly when the pointer 41 arrives at the zero position, so that the point of the pawl is engaged by the shoulder 87.

Before returning the mechanism to zero, the cost of any amount of goods measured can be read by the operator through the window 50 in the face plate of the machine.

In order to prevent injury to any part of the mechanism or to the web at the limit of the measuring capacity of the machine, the roller 6, is automatically arrested. This is also accomplished through the medium of the finger 66 Figure 10, which is pushed toward the left by the dog or pin 70, thereby rocking the dog 69 which moves the end of the stop lever 72 into the path of the shoulder or tooth 74 on disc 75 which rotates with the measuring roller.

It is understood that the embodiment of the invention described hereinabove is only one of the many embodiments this invention may take, and I do not wish to be limited in the practice of my invention, nor in my claims, to the particular embodiment set forth.

What I claim is:—

1. In a computing machine, in combination with a frame, a measuring roller mounted therein and adapted to be rotated by the goods passed thereover, a circular scale located in one end portion of said frame, a pointer actuated by the movement of said measuring roller and co-operating with said circular scale to indicate a unit and fractions of the unit of measure, a web also actuated by said measuring roller and movable transversely of said frame in the opposite end portion thereof, a take-up roller and a drum supporting said web and located above and extending parallel with said measuring roller, the take-up roller being geared to said measuring roller, and a fixed scale bearing numbers indicating different prices of the goods, said web having numbers visible through said frame at a point adjacent to said circular scale indicating the number of cyclic movements of said pointer and having tabulated figures in alinement with the numbers of said fixed scale to indicate the cost of the goods for any pre-determined number of units or fractions thereof.

2. In a cloth measuring and computing machine, in combination with a frame, a measuring roller mounted therein and adapted to be rotated by the goods passed thereover, a circular scale located in one end portion of said frame for indicating a unit of measure and fractions thereof, an indicator co-operating with said scale, said indicator and scale having a relative rotary movement under actuation by said measuring roller, a web also actuated by said measuring roller and movable transversely of said frame in the opposite end portion thereof, a take-up roller and a drum supporting said web and located above and extending parallel with said measuring roller, the take-up roller being geared to said measuring roller, and a fixed scale bearing numbers indicating different prices of the goods, said web having numbers visible through said frame at a point adjacent to said circular scale for indicating the number of relative rotary movements between said indicator and scale, and having tabulated figures in alinement with the numbers of said fixed scale to indicate the cost of goods for any pre-determined number of units or fractions thereof.

3. In a machine of the class described, the combination of a rotary member mounted so as to be actuated by goods passed through the machine, a fixed price scale, a web having tabulated figures alining with the numbers of said price scale, to indicate the cost of different quantities of goods, means for guiding said web past said fixed scale, means for driving said web from said rotary member, means for exerting tension in said web to return the same to its zero position after each measuring operation, means for stopping the return movement at the zero position of the web, and means for regulating the speed of the return movement to prevent a shock to the web when arrested at its zero position.

4. In a machine of the class described, the combination of a rotary member mounted so as to be actuated by goods passed through the machine, a pointer, a scale co-operating therewith, a fixed price scale, a web having tabulated figures alining with the numbers of said price scale to indicate the cost of different quantities of goods, means for guiding said web past said fixed scale, mechanism driven by said rotary member, for giving said pointer and said web corresponding movements, means for exerting tension in said web to return the same to its zero position, said means operating to impart movement through the web to said pointer to return it to its zero position, means for stopping the return movement of the pointer at its zero position, and means for regulating the return movement to prevent a shock to said web when the pointer is stopped at its zero position.

5. In a cloth measuring and computing machine, the combination of a rotary member mounted so as to be rotated by the goods passed thereover, a dial, a pointer co-operating with said dial, a fixed scale bearing numbers indicating different prices of the goods, a web having tabulated figures in alinement with the numbers of said fixed scale to indicate the cost of goods for any predetermined number of units or fractions thereof, a drum upon which said web is normally coiled, a take-up roller for winding up said web to move the same past said fixed scale, mechanism for driving said take-up roller and pointer from said rotary member, means associated with said drum for maintaining tension in said web, and operating to return said web to zero position, and for exerting tension through said web to return said pointer to its zero position, means for releasing said driving mechanism from said rotary member after the measuring movement to permit a return movement of the pointer and web to their zero positions, means for stopping the return movement when the said pointer arrives at its zero position, and means for controlling the speed of said mechanism in the return movement to prevent a shock to said web when the return movement of the indicating mechanism is stopped at the zero position.

6. In a cloth measuring and computing machine, the combination of a rotary member mounted so as to be rotated by the goods passed thereover, a dial having a unit of measure and fractions thereof indicated thereupon, a pointer cooperating therewith, a fixed price scale indicating different prices of the goods, a web having tabulated figures in alinement with the numbers of said price scale to indicate the cost of goods for any predetermined number of units or fractions thereof, a drum upon which said web is normally coiled, a take-up roller for winding up said web to move the same past said fixed scale, driving mechanism driven by said rotary member and operating to drive said pointer successively around said dial, and to drive said take-up roller and web to correspond with the movement of said pointer, a spring associated with said drum for maintaining tension in said web, means for disconnecting said driving mechanism from said rotary member, after the measuring movement, said spring operating when said driving mechanism is so disconnected to return said web to zero position, and operating to exert tension through said web to return said pointer to its zero position, means for stopping the return movement when the said pointer arrives at its zero position, and a governor device for controlling the speed of the mechanism in the return movement to prevent a shock to said web when said pointer is stopped at its zero position.

7. In a cloth measuring and computing machine, the combination of a measuring roller mounted so as to be rotated by the goods passed thereover, a dial having a unit of measure and fractions thereof indicated thereupon, a pointer to revolve successively around said dial and cooperate with said dial, a fixed price scale bearing numbers indicating different prices of the goods, a web having numbers to indicate the number of revolutions of the pointer around its dial, and having tabulated figures in alinement with the numbers of said price scale to indicate the cost of goods for any predetermined number of units or fractions thereof, a drum upon which said web is normally coiled, a take-up roller for winding up said web from said drum to move the same past said price scale, driving mechanism for driving said pointer and said take-up roller from said rotary member, means for disconnecting said driving mechanism from said measuring roller after the measuring operation, a spring associated with said drum to return said web to zero position and for exerting tension through said web to return said pointer to its zero position, and means for stopping the return movement when the said pointer arrives at its zero position.

8. In a machine of the class described, the combination of a rotary member mounted so as to be actuated by goods passed through the machine, a fixed price scale, a web having tabulated figures alining with the numbers of said price scale, to indicate the cost of different quantities of goods, means for driving said web from said rotary member, means for exerting tension in said web to return the same to its zero position after each measuring operation, means for stopping the return movement at the zero position of the web, and means for regulating the speed of the return movement to prevent a shock to the web when arrested at its zero position.

In testimony whereof, I have hereunto set my hand.

WALTER E. HOSCH.